Sept. 2, 1952  E. VAN SICKLE  2,609,207
VALVE MECHANISM
Filed June 6, 1947  3 Sheets-Sheet 1

INVENTOR.
ELMER VAN SICKLE
BY
Kwis, Hudson,
Boughton & Williams
ATTORNEYS

Sept. 2, 1952  E. VAN SICKLE  2,609,207
VALVE MECHANISM

Filed June 6, 1947  3 Sheets-Sheet 2

INVENTOR.
BY ELMER VAN SICKLE
Kwis, Hudson, Boughton & Williams
ATTORNEYS

Sept. 2, 1952 — E. VAN SICKLE — 2,609,207
VALVE MECHANISM
Filed June 6, 1947 — 3 Sheets-Sheet 3

INVENTOR.
ELMER VAN SICKLE
Kwis, Hudson,
Boughton & Williams
ATTORNEYS

Patented Sept. 2, 1952

2,609,207

UNITED STATES PATENT OFFICE 2,609,207

VALVE MECHANISM

Elmer Van Sickle, Rocky River, Ohio

Application June 6, 1947, Serial No. 753,024

20 Claims. (Cl. 277—20)

The present invention relates to fluid actuated devices and, more particularly, to means for controlling the flow of fluid to and from one or a plurality of fluid actuated motors, especially hydraulic motors, of the double acting or reversible, oscillating or reciprocating piston or cylinder type where it is desired to stop the motor or motors intermediate their limits of travel and retain them in the position in which they are stopped.

The principal object of the invention is the provision of a novel and improved valve or valve mechanism adapted to be interposed between a source of fluid pressure, preferably a continuously operating pump, and one or a plurality of fluid actuated motors, especially of the type referred to for controlling the actuation thereof, which valve will be simple in construction; will not necessitate the close tolerances ordinarily required in valves; will be positive in operation; inexpensive to manufacture; will normally retain the motor or motors in any position intermediate their limits of travel by preventing the flow of fluid from either side except when adjustment or actuation thereof is desired; will permit the pump, in the event a continuously operating pump is employed, to operate under no load except when fluid under pressure is required to actuate one of the motors, thereby reducing the wear on the pump and the load on the driving means; will permit any one of a plurality of motors to be operated selectively without disturbing the adjustment or setting of another; and preferably wherein the pressure of the fluid applied to a motor can be varied by merely varying the pressure applied to an operating lever, thus providing maximum control over the amount and speed of movement of the motor which it is desired to adjust.

The invention resides in certain constructions and combinations and arrangements of parts and further objects and advantages will be apparent to those skilled in the art to which it relates from the following description of the preferred embodiments described with reference to the accompanying drawings forming a part of the specification, in which similar reference characters designate corresponding parts, and in which.

Generally speaking, the invention comprises a valve or valve means adapted to be connected between a source of fluid pressure, preferably a continuously operating pump, and one or a plurality of fluid pressure actuated motors, preferably of the double acting or reversible, oscillating or reciprocating piston or cylinder type, and normally retain the motor, or, motors controlled thereby, as the case may be, in any desired position intermediate the limits of their travel regardless of the direction or variation of the load applied thereto by preventing discharge of the operating fluid from either side of the motor or motors except when movement or actuation thereof is desired, in which event fluid is supplied to one side of the motor to be actuated and the other side connected to exhaust. Preferably the fluid normally flows under no pressure through the valve and when it is desired to actuate a motor, the flow of fluid is obstructed whereupon pressure is built up in the valve, which pressure may be subsequently utilized to open the side of the motor connected to exhaust.

The invention is particularly applicable to situations where one or a plurality of fluid pressure actuated motors are employed to move or adjust one or a plurality of members to an infinite number of different positions intermediate their limits of travel; for example, a control surface of an airplane, such as, the elevators or rudder or an agricultural implement, such as, a power or cultivator connected to a tractor for vertical movement.

Figure 1:
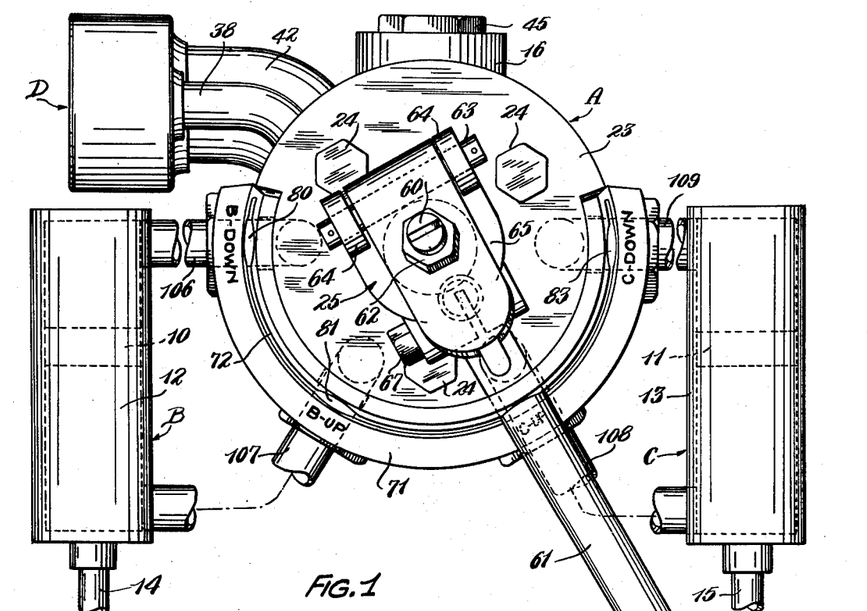
Fig. 1 is a view of a hydraulic system comprising a valve embodying the present invention, with the valve shown in plan.
Figure 2:
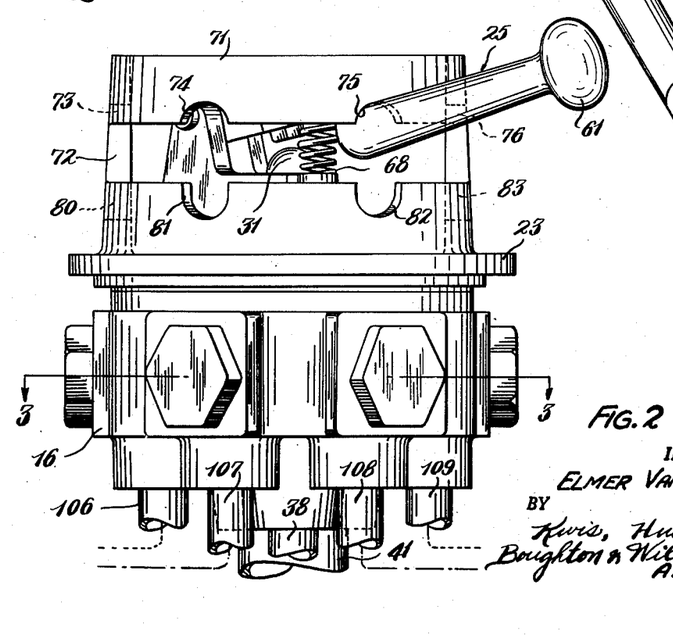
Fig. 2 is a side view of the valve shown in Fig. 1.

Although the invention may be embodied in a number of different forms, it is herein shown and described as embodied in a valve A of specific construction and forming a part of a hydraulic system comprising two reciprocating piston type motors B, C and a pump D together with the necessary piping, etc. The motors B, C are of conventional construction and comprise pistons 10, 11 slidable within suitable cylinder members 12, 13 and connected to piston rods 14, 15, respectively, which piston rods are, in turn, adapted to be connected to some mechanism which it is desired to move or adjust to an infinite number of variable positions intermediate the limits of travel of the pistons 10, 11. The pump D may be of any commercial construction and includes a suitable sump.

The valve A shown comprises a valve body 16 having a cylindrical aperture 17 opening into the top and within which aperture a member 18, hereinafter referred to as the valve member, is rotatably supported. The valve member 18 comprises lower, intermediate and upper cylindrical sections 20, 21 and 22, respectively, and is retained in the aperture 17 by a cover 23 detachably secured, as by the bolts 24, to the valve body 16. The lower part 20 of the valve member 18 forms a medium fit with the lower part of the aperture 17 and the upper reduced part 22 projects through a flanged aperture in the cover 23 and is provided with a handle assembly 25 by means of which it may be turned to different positions. The under part of the cover 23 engages the shoulder formed by the reduction in diameter between the intermediate and upper parts or sections of the valve member. Leakage of fluid about the upper part 22 of the valve member may be prevented by the provision of some suitable packing, such as, the O-ring 26 located in a suitable groove in the part 22 of the valve member and located within the flanged opening in the cover 23.

Figure 4:
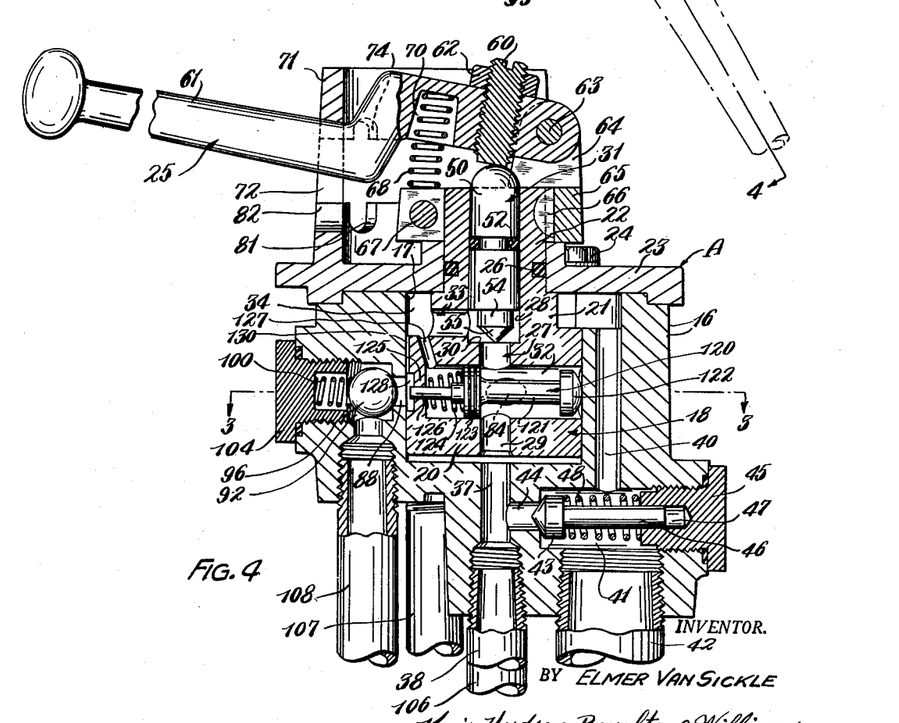
Fig. 4 is a sectional view approximately on the line 4—4 of Fig. 3.

The valve member 18 is provided with a central axial bore or passage 27, the upper part 28 of which is of slightly larger diameter than the lower part 29 forming a shoulder, the inner rim 30 of which constitutes a valve seat for a vertically reciprocating valve 31 slidably supported in the upper part 28 of the bore 27. In addition to the vertical bore 27, the valve member 18 is provided with a transversely extending, cylindrical aperture or chamber 32 opening into the right-hand side thereof, as viewed in Fig. 4, and intersecting the vertical bore 27, and one or more transversely extending apertures 33 communicating with the upper part 28 of the bore 27 and the annular passage or chamber 34 in the upper part of the aperture 17 formed by the intermediate section 21 of the valve member. The lower end of the bore 27 communicates with an aligned conduit or passage 37 in the valve body 16, which passage is, in turn, connected by a supply conduit or pipe 38 to the discharge or pressure side of the pump D. Normally the hydraulic fluid from the pump D circulates continuously under no pressure through the valve mechanism by way of the passages 27, 33, the annular chamber 34, and an exhaust passage 40, the upper end of which is in continuous communication with the annular chamber 34 and the lower enlarged end of which is in continuous communication by a transverse chamber 41 with an exhaust conduit or pipe 42 connected to the sump of the hydraulic pump D. In the embodiment shown, the pipe 42 constitutes a mounting or support for the valve.

When it is desired to create pressure to actuate one of the motors B, C, the handle mechanism is manipulated to move the valve 31 toward the valve seat 30 to prevent the free return or flow of fluid to the sump, thus causing pressure to be built up within the lower part 29 of the bore 27. In the embodiment shown, the building up of excessive pressure is prevented by a spring-pressed relief valve 43 located in the transversely extending aperture 41 in the valve body and intersecting the aperture 40. The bottom of the chamber 41 is in communication with the passage or conduit 37 by a passage 44 of less diameter than the chamber 41. The inner rim of the shoulder formed by the change in diameter between the chamber 41 and the passage 44 constitutes a valve seat for the valve 43. The outer end of the chamber 41 is closed by a plug 45 threaded into the outer end thereof. The relief valve 43 is provided with a valve stem 46 slidably supported in a suitable aperture 47 in the plug 45 and is urged toward its seat by a compression spring 48 interposed between the valve proper and the inner end of the plug 45. If desired, the relief valve may be omitted or may be of the adjustable type.

The valve 31 shown comprises a cylindrical body 50 provided intermediate its ends with a groove within which an O-ring 52 is located for preventing the leakage of fluid thereabout. The upper end of the body 50 is dome-shaped and the lower end 54, which is of reduced diameter, is provided with a cone-shaped point 55 for engagement with the valve seat 30. As previously stated, the valve is moved toward its seat by a manually operated mechanism to close communication between the lower reduced part 29 of the axial bore 27 and the upper enlarged portion 28 thereof and, in turn, prevent the free flow of fluid from the lower part 29 to the sump. Alternatively, valve means other than the particular construction shown may be used to selectively prevent the flow of fluid from the lower part of the passage 27 to the sump; for example, the lower reduced end 54 of the cylindrical valve body 50 may be omitted, in which event vertical movement of the cylindrical body could be employed to close or open the inner ends of the transversely extending passages 33.

As shown, the upper end of the valve 31 is engaged by an adjustable screw 60 connected to a handle 61. The screw 60 is adapted to be retained in any adjusted position by a lock nut 62. The handle 61 is pivotally connected by a pin 63 to a pair of upstanding lugs 64 formed integral with a split, collar-like member 65 keyed to the upper reduced end 22 of the valve member 18 as by a key 66 and retained in position thereon by a bolt 67 projecting through the split ends of the member 65. The handle 61 is continuously urged in a clockwise direction, as viewed in Fig. 4, about its pivot 63 by a compression spring 68 interposed between the bottom of an aperture 70 in the underside of the handle and the upper side of the member 65. The cover 23 includes an upstanding, semi-circular, flange-like portion 71 having an intermediate slot 72 through which the handle 61 extends. The upper and lower sides of the slot 72 are provided with a plurality of notches 73, 74, 75, 76, and 80, 81, 82, 83, respectively, for assisting in positioning the valve member in one of the four operating positions hereinafter referred to.

In addition to the passages previously referred to, the valve member 18 is provided with two passages 84, 85 in the plane of the chamber 32 equally spaced with respect to the axis thereof and continuously in communication with the chamber 32, the lower part 29 of the aperture 27, and the exterior of the portion 20 of the valve member. The passages 84, 85 are adapted to be selectively aligned with passages 86, 87, 88 and 89 in the valve body for directing the hydraulic fluid to one end or the other of the motors B, C. The passages 86 to 89 are in the plane of the passages 84, 85 and are circumferentially spaced apart a distance equal to one-half the distance between the ends of the passages 84, 85 adjacent thereto. The passages 86 to 89 are counterbored from their radially outer ends to form valve chambers 90 to 93, respectively, within which are positioned check valves in the form of balls 94 to 97, respectively, continuously urged against the rim of the shoulder formed by the change in diameter, by compression springs 98 to 101, respectively, interposed between the outer sides of the balls and the bottom of apertures formed in plugs 102 to 105, respectively, threaded into and closing the outer ends of the apertures 86 to 89.

The valve chambers 90 to 93, inclusive, are in continuous communication with vertically extending apertures or passages opening into the underside of the valve housing or body 16, which apertures are adapted for connection to pipes or conduits for connecting the valve A to the motors B, C. In the embodiment shown, the valve chamber 90 is connected to the upper end of the motor B by a conduit or pipe 106; the valve chamber 91 to the lower end of the motor B by a conduit or pipe 107; the valve chamber 92 to the lower end of the motor C by a conduit or pipe 108; and the valve chamber 93 to the upper end of the motor C by a conduit or pipe 109. The system is normally maintained completely filled with incompressible hydraulic fluid.

Figure 3:
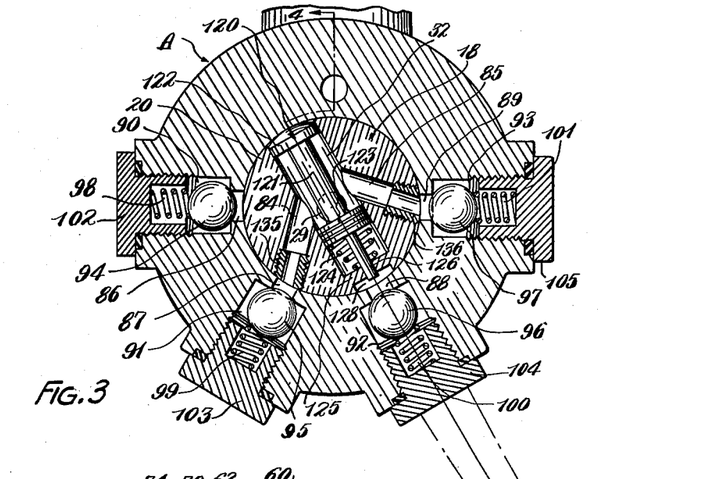
Fig. 3 is a sectional view, with portions in elevation, approximately on the line 3—3 of Figs. 2 and 4.

Referring particularly to Fig. 3, it will be seen that with the valve member in the position shown therein, the passages 84 and 85 are in position to direct the hydraulic fluid to the lower side of the motor B and the upper side of the motor C, respectively; however, the hydraulic fluid is flowing through the aperture or conduit 27 of the valve mechanism under no pressure. As the handle 61 is moved from the position shown in Fig. 4 into the lower notch 82, the free flow of fluid to the sump is obstructed and pressure caused to build up within the apertures 29, 32, 84, 85, etc. The pressure of the fluid can be controlled by varying the force applied to the handle 61. As pressure builds up within the passages 84, 85, fluid pressure is applied to the ends of the motors B, C, previously mentioned; however, the pistons of the motors do not move as the opposite ends thereof, which are filled with hydraulic fluid, are closed by the check valves 94 and 96, respectively. In like manner, the check valves 95, 97 prevent movement of the pistons in the opposite direction when either of the apertures 84, 85 is aligned with one of the apertures 86, 88.

Provision is made for selectively opening or moving one of the check valves 94 to 97 from its seat when it is desired to effect movement or adjustment of one of the motors and, in turn, the mechanism operated thereby. As shown in Figs. 1 to 4, this is accomplished by a piston or plunger 120 slidably located in the chamber 32 and having a reduced middle portion 121 forming piston heads 122, 123 at the right-hand and left-hand ends thereof, as viewed in Fig. 4. The construction is such that the left-hand head 123 is always to the left of the inner ends of the passages 84 and 85 and the bore 27, with the result that it is always in a position such that its right-hand side is acted upon by any pressure built up incident to the closing of valve 31. The piston 120 is continuously urged toward the right, as viewed in Fig. 4, by a compression spring 124 interposed between the left-hand head 123 and the bottom of the chamber 32 formed by a wall 125. The piston 120 includes a rod-like part 126 projecting toward the left from the left-hand head 123 through a small aperture formed in the bottom wall 125. The left-hand end of the aperture 32 is continuously vented to the annular passage 34 and, in turn, the sump by a small passage 127 in the valve member 18. The right-hand head 122 of the piston 120 is slightly smaller in diameter than the diameter of the chamber 32 and with the right-hand end of the chamber 32 forms a dash-pot which enhances the performance of the piston 120 by reducing chatter, etc. The right-hand side of the piston head 122 is dome-shaped so that hydraulic fluid is interposed therebetween and the wall of the aperture 17 adjacent thereto at all times.

As pressure is built up in the passage 32 to the right-hand side of the head 123, the plunger or piston 121 is moved toward the left causing the rod-like section 126 thereof to unseat the ball check valve with which it is aligned, which with the parts in the position shown in the drawings, is the check valve 96. When the pressure to the right of the piston head 123 reaches a required amount, the ball check valve aligned with the piston is raised from its seat allowing hydraulic fluid to flow inwardly through the passage controlled thereby and the motor connected therewith to move, assuming that there is sufficient pressure applied to the opposite side of the motor or sufficient load in the motor to move the same. It is to be noted that when the part 126 of the piston 120 is aligned with any of the check valves, the opposite side of the motor associated therewith is connected to one or the other of the passages 84, 85 and that the check valve will not be opened until the fluid in the passages 84, 85 is under pressure.

The hydraulic fluid flowing around the check valve and through the passage in the valve body in which it is located exhausts into a chamber 128 in the circumference of the valve member 18, which chamber surrounds the part 126 of the piston 120 and is continuously in communication with the annular chamber 34 by a small vertical groove 130 formed in the cicrumference of the bottom part 20 of the valve member 18. The maximum speed at which the motors can move in either direction can be controlled by controlling the rate at which hydraulic fluid can be discharged or exhausted therefrom as by varying the size of the groove 130. Preferably the construction is such that the hydraulic fluid will not flow from a motor faster than it can be supplied to the opposite end. The bottom of the chamber 32 is closed and the part 126 of the plunger 120 is made comparatively small so that the returning hydraulic fluid will not materially affect the operation of the plunger or piston 120.

The restriction of the rate of flow of hydraulic fluid from the motors to an amount less than that which can be supplied to the other ends assures the maintenance of pressure in the apertures 28, 32, 84, 85, etc. If pressure is not maintained in the chamber 32, the piston 120 will return to its initial position, allowing the check valve actuated thereby to close and the movement of the motor interrupted until the check valve is again opened by the building up of the required pressure in the chamber 32. Pressure in the chamber 32 can also be maintained, assuming that the valve 31 is closed, by restricting the apertures 84, 85 so that they will not pass more fluid than can be supplied by the pump or other source of fluid pressure at the pressure required to maintain one of the check valves open; however, this would not prevent the motor or piston from moving faster than hydraulic fluid was being supplied thereto, assuming that the motor was under load in a direction to exhaust hydraulic fluid from the end associated with the opened check valve. As shown in Fig. 3, the apertures 84, 85 are provided with removable tubular inserts 135, 136 which can be replaced, if desired, by similar inserts having smaller or larger openings therethrough.

Figure 5:
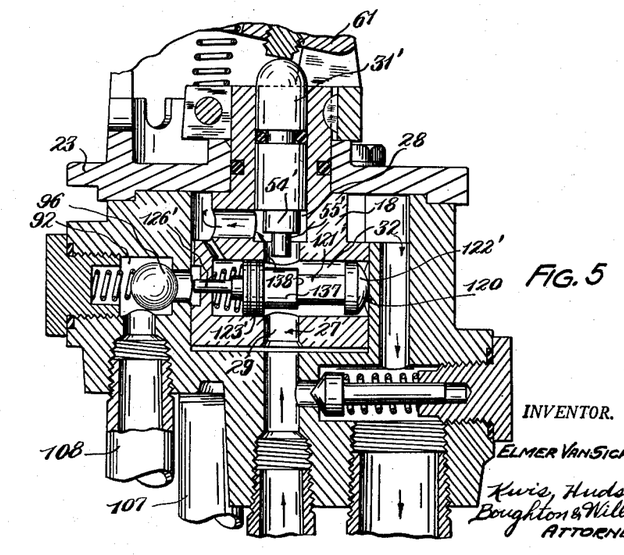
Fig. 5 is a view similar to Fig. 4 but showing a valve of slightly modified construction.

Two different modifications of the construction shown in Figs. 1 to 4 and described above are shown in Figs. 5 and 6 wherein the duplicate parts are designated by the same reference characters. As shown in Fig. 5, the plunger or piston 120′ which corresponds with the piston 120 of the embodiment previously described, has a section 137 adjacent to the left-hand piston head 123′, the diameter of which section is intermediate that of the piston head 123′ and the part 121′ connecting the right and left-hand heads 122′, 123′. The section 137 forms with the part 121′ a shoulder 138 adapted to engage the lower end of a cylindrical projection 55′ on a cylindrical part 54′ of the valve 31′ when the plunger or piston 120′ has been moved by pressure in the chamber 32 to a position to unseat a check valve aligned with its forwardly extending operating part 126′, upon continued movement of the valve 31′ in a downward direction subsequent to the closing of the upper end of the lower portion 29 of the bore or aperture 27 through the valve member 18 by the part 54′.

The part 54′ is of slightly less diameter than the corresponding portion 54 of the valve 31 and is of a diameter such that it will fit into the upper end of the aperture 29 upon downward movement of the valve 31′. The length of the portion 54′ of the valve 31′ with respect to the length of the part 55′ is preferably such that the upper end of the aperture 29 is completely closed before the lower end of the part 55′ is moved into position to engage behind the shoulder 138. The construction is such that a check valve unseated by the plunger or piston 120′ can be held open by continuing to hold the handle 61 down even though the pressure in the chamber 32 may drop to or approximately zero. With this construction, it is not necessary to restrict the flow of fluid to or from the motors at a rate of flow less than that of the supply in order to maintain pressure in the chamber 32 and keep a check valve open to permit movement or actuation of a motor. Under some circumstances, this is desirable.

Figure 6:
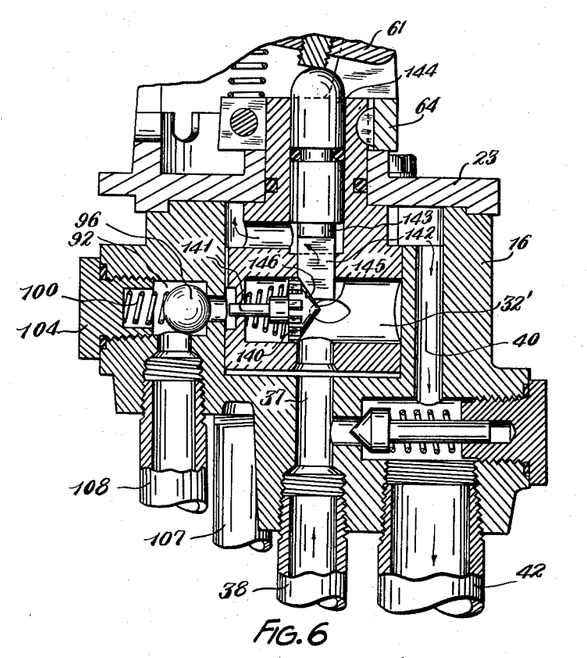
Fig. 6 is a view similar to Fig. 4 but showing a valve of slightly different modified construction.

The valve shown in Fig. 6 differs from that shown in Figs. 1 to 4 principally in the fact that the plunger 140 corresponding with the piston 120 is moved by manipulation of the handle 61 in a positive manner and independent of pressure in the chamber 32 to unseat a check valve aligned with the rod-like projection 141 thereof corresponding with the part 126 of the piston 120 by a projection 142 on the lower end of the part 143 of the valve 144 corresponding with the valve 31. In the embodiment shown in Fig. 6, the vent 127 for the left-hand end of the chamber 32 is omitted and the plunger 140 merely consists of a cylindrical member slidably supported in the chamber 32′ and having a plurality of splines or grooves in the circumference thereof so that the pressure on opposite sides thereof is equal. The aperture 32′ is of slightly larger diameter than the aperture 32 of the previous embodiments and certain other dimensions of the valve are increased in proportion but these changes are immaterial. Like the part 54′, the part 143 is of slightly less diameter than the diameter of the upper end of the lower portion 29 of the aperture 27 through the valve member 18, the construction being such that as the valve 144 is moved in a downward direction, the upper end of the section 29 of the aperture 27 is closed and the plunger 140 is moved to unseat a check valve with which it is aligned by the engaging inclined surfaces 145, 146. The part 142 of the valve is comparatively narrow so that normally hydraulic fluid flows from the pump through the conduits 38, 27 and 33 to the chamber 34 and, in turn, to the sump.

From the foregoing, it is believed that the operation of the embodiments described will be apparent. Suffice it to say that the systems are normally full of hydraulic fluid and that the motors are held in any predetermined or adjusted position by the hydraulic fluid trapped or retained in opposite sides thereof by the check valves. The hydraulic fluid normally flows through the entrance conduit 38, the conduits or apertures 37, 27, 33, the annular chamber 34, the aperture or conduit 40, the chamber 41 and exhaust through the conduit 41. When it is desired to move or adjust one of the motors in one direction, the movable valve member 18 is rotated until one of the conduits or apertures 84, 85 therein aligns with the aperture in the valve body connected to the side of the motor to which hydraulic fluid is to be supplied and the operating extension of the movable plunger or piston in the chamber 38 is aligned with the ball check valve associated with the other side of the motor. Thereafter the operating handle 61 is moved in a downward direction to actuate the selected motor.

Referring particularly to Figs. 1 to 4, downward movement of the valve 31 closes off the upper part 28 of the aperture 27, whereupon pressure is built up in the chamber 32 and the apertures 84, 85, the amount of which pressure can be readily controlled by raising or lowering the operating handle 61. When the pressure in the chamber 32 has reached the required amount, the ball check valve in alignment with the operating member 126 of the plunger or piston 120 will be unseated, allowing the hydraulic fluid to escape from that side of the selected motor with which the ball check valve is associated, whereupon the motor is permitted to move in the desired direction. Simultaneously hydraulic fluid under pressure will be supplied to the opposite side of the motor. As previously stated, the construction is preferably such that hydraulic fluid will not be discharged from a motor faster than it can be supplied to the opposite side thereof. This maintains pressure in the chamber 32 and the check valve open as long as the valve 31 is held closed. As previously described, pressure may be maintained in the chamber 32 by restricting the conduit or aperture through which the fluid is discharged into the motor but this method of maintaining pressure in the chamber 32 has certain disadvantages in that a vacuum may be created in the motor if it is under sufficient load tending to move it in the selected direction. Under some conditions this would be undesirable as it might lessen the control which the operator has over the extent of movement of the motor. Obviously any motor may be adjusted without interfering with the adjustment of one of the other motors and any number of motors may be controlled limited only by the size of the valve.

In the embodiment showin in Fig. 5, continued movement of the valve 31′ in a downward direction subsequent to the unseating of the selected check valve by the piston or plunger 120′ projects the lower end of the extension 55′ of the valve behind the shoulder 138, thus preventing return of the piston 120′ to its initial position and reseating of the ball check valve until the handle 61 is raised even though the pressure in the chamber 32 may fall below that required to maintain the check valve open.

In the embodiment shown in Fig. 6, pressure in the chamber 32' is not depended upon to unseat the ball check valve associated with the side of the cylinder from which hydraulic fluid is to be exhausted but the check valve is positively moved from its seat upon downward movement of the valve 144 by the cooperating cam surfaces 145, 146 on the right-hand side of the plunger 140 and the lower extension 142 of the valve 144.

From the foregoing it will be apparent that the objects of the invention heretofore enumerated have been accomplished and that there has been provided a new and improved valve mechanism for controlling one or a plurality of fluid pressure actuated motors. While the preferred embodiments of the invention have been described in considerable detail, it is to be understood that the invention may be otherwise embodied but it is my intention to cover hereby all adaptations, modifications and uses which come within the practice of those skilled in the art to which the invention relates and the scope of the appended claims.

Having thus described my invention, I claim:

1. In a valve mechanism, the combination of a valve body having a pair of passages adapted for connection with opposite chambers of a fluid actuated motor, means in said passages in said valve body normally preventing the flow of fluid from said chambers inwardly through said passages whereby said motor is normally retained in a predetermined position, a valve member movable relative to said valve body and having a passage therein adapted for connection with a source of fluid and selectively with one of said passages in said valve body, means for connecting to exhaust the passage of said pair of passages in said valve body other than the passage connected with said passage in said valve member when one of said passages in said valve body is connected with said passage in said valve member, and means responsive to pressure in said passage in said valve member for opening the first-named means in the passage of said pair of passages in said valve body connected with exhaust.

2. In a valve mechanism, the combination of a valve body having a pair of passages adapted for connection with opposite chambers of a fluid actuated motor, means in said passages in said valve body normally preventing the flow of fluid inwardly through said passages whereby said motor is normally retained in a predetermined position, a valve member movable relative to said valve body and having a passage therein adapted for connection with a source of fluid and selectively with one of said passages in said valve body, means comprising a second passage in said valve member for connecting to exhaust the passage of said pair of passages in said valve body other than the passage connected with said first passage in said valve member when one of said passages in said valve body is connected with said first passage in said valve member, and means in said valve member responsive to pressure in said first passage in said valve member for opening the first-named means in the passage of said pair of passages in said valve body other than the passage with which said first passage in said valve member is connected.

3. In a valve mechanism, the combination of a valve body having a pair of passages in said valve body adapted for connection with opposite chambers of a fluid actuated motor, means in said passages normally preventing the flow of fluid from said chambers inwardly through said passages whereby said motor is normally retained in a predetermined position, a valve member movable relative to said valve body and having a passage therein adapted for connection with a source of fluid and with exhaust and selectively with one of said passages in said valve body, means for connecting to exhaust the passage of said pair of passages in said valve body other than the passage connected with said passage in said valve member when one of said passages of said pair of passages in said valve body is connected with said passage in said valve member, means for restricting the flow of fluid through said passage in said valve member to cause pressure to be built up in a part of said passage in said valve member including the part adapted to be selectively connected with said passages in said valve body, and means responsive to pressure in said first passage in said valve member for opening the first-named means in the passage of said pair of passages in said valve body other than the passage with which said passage in said valve member is connected.

4. In a valve mechanism, the combination of a valve body having a pair of passages adapted for connection with opposite chambers of a fluid actuated motor of the double acting or reversible oscillating or reciprocating or cylinder type, means in said passages in said valve member normally preventing the flow of fluid from said chambers inwardly through said passages whereby said motor is normally retained in a predetermined position, a valve member rotatable relative to said valve body and having a passage therein adapted for connection with a source of fluid and with exhaust and selectively with one of said passages in said valve body, means for connecting to exhaust the passage of said pair of passages in said valve body other than the passage connected with said passage in said valve member when one of said passages in said valve body is connected with said passage in said valve member, means for restricting the flow of fluid through said passage in said valve member to cause pressure to be built up in a part of said passage in said valve member including the part adapted to be selectively connected with said passages in said valve body, and means responsive to pressure in said first passage in said valve member for opening the first-named means in the passage of said pair of passages in said valve body other than the passage with which said passage in said valve member is connected.

5. In a valve mechanism, the combination of a valve body having a pair of passages adapted for connection with opposite chambers of a fluid actuated motor of the double acting or reversible oscillating or reciprocating or cylinder type, means in said passages in said valve body normally preventing the flow of fluid from said chambers inwardly through said passages whereby said motor is normally retained in a predetermined position, a valve member rotatable relative to said valve body and having a passage therein adapted for connection with a source of fluid and with exhaust and selectively with one of said passages in said valve body, means for connecting to exhaust the passage of said pair of passages in said valve body other than the passage connected with said passage in said valve member when one of said passages in said valve body is connected with said passage in said valve member, movable means for restricting the flow of fluid through said passage in said valve member to cause pressure to be built up in a part of said passage in said valve member including the part adapted to be selectively connected with said passages in said valve body, a single manually operable lever for producing relative rotation between said valve body and said valve member to selectively connect said passage in said valve member with one of said passages in said valve body and for controlling the movement of said means for restricting the flow of fluid through said passage in said valve member, and means for opening the first-named means in the passage of said pair of passages other than the passage with which said passage in said valve member is connected.

6. In a valve mechanism, the combination of a valve body having a pair of passages adapted for connection with opposite chambers of a fluid actuated motor of the double acting or reversible oscillating or reciprocating or cylinder type, means in said passages in said valve body normally preventing the flow of fluid from said chambers inwardly through said passages whereby said motor is normally retained in a predetermined position, a valve member rotatable relative to said valve body and having a passage therein adapted for connection with a source of fluid and with exhaust and selectively with one of said passages in said valve body, means for connecting to exhaust the passage of said pair of passages other than the passage connected with said passage in said valve member when one of said passages in said valve body is connected with said passage in said valve member, movable means for restricting the flow of fluid through said passage in said valve member to cause pressure to be built up in a part of said passage including the part adapted to be selectively connected with said passages in said valve body, means for opening the first-named means in the passage of said pair of passages in said valve body other than the passage with which said passage in said valve member is connected, and a single manually operable lever for producing relative rotation between said valve body and said valve member to selectively connect said passage in said valve member with one of said passages in said valve body and for controlling the movement of said movable means for restricting the flow of fluid through said passage in said valve member and for moving said last named means.

7. In a valve mechanism, the combination of a valve body having a pair of passages adapted for connection with opposite chambers of a fluid actuated motor of the double acting or reversible oscillating or reciprocating or cylinder type, check valves in said passages normally preventing the flow of fluid inwardly through said passages whereby said motor is normally retained in a predetermined position, a valve member rotatable relative to said valve body and having a passage therein adapted for connection with a source of fluid and with exhaust and selectively with one of said passages in said valve body, means in said valve member for connecting to exhaust the passage of said pair of passages in said valve body other than the passage connected with said passage in said valve member when one of said passages in said valve body is connected with said passage in said valve member, means for restricting the flow of fluid through said passage in said valve member to cause pressure to be built up in a part of said passage including the part adapted to be selectively connected with said passages in said valve body, and means responsive to pressure in said passage in said valve member for opening said check valve in the passage of said pair of passages in said valve body other than the passage with which said passage in said valve member is connected.

8. In a valve mechanism, the combination of a valve body having a pair of passages adapted for connection with opposite chambers of a fluid actuated motor of the double acting or reversible oscillating or reciprocating or cylinder type, check valves in said passages in said valve body normally preventing the flow of fluid inwardly through said passages whereby said motor is normally retained in a predetermined position, a valve member rotatable relative to said valve body and having a passage therein adapted for connection with a source of fluid and with exhaust and selectively with one of said passages in said valve body, means comprising a conduit in said valve member for connecting to exhaust the passage of said pair of passages in said valve body other than the passage connected with said passage in said valve member when one of said passages in said valve member is connected with said passage in said valve member, means for restricting the flow of fluid through said passage in said valve member to cause pressure to be built up in a part of said passage including the part adapted to be selectively connected with said passages in said valve body, and means for opening the check valve in the passage of said pair of passages in said valve body other than the passage with which said passage in said valve member is connected.

9. In a valve mechanism, the combination of a valve body having a pair of passages adapted for connection with opposite chambers of a fluid actuated motor of the double acting or reversible oscillating or reciprocating or cylinder type, check valves in said passages in said valve body normally preventing the flow of fluid from said chambers inwardly through said passages whereby said motor is normally retained in a predetermined position, a valve member rotatable relative to said valve body and having a passage therein adapted for connection with a source of fluid and with exhaust and selectively with one of said passages in said valve body, means comprising a restricted conduit in said valve member for connecting to exhaust the passage of said pair of passages in said valve body other than the passage connected with said passage in said valve member when one of said passages in said valve body is connected with said passage in said valve body, means for restricting the flow of fluid through said passage in said valve member to cause pressure to be built up in a part of said passage in said valve member including the part adapted to be selectively connected with said passages in said valve body, and means for opening the check valve in the passage of said pair of passages in said valve body other than the passage with which said passage in said valve member is connected.

10. In a valve mechanism, the combination of a valve body having a pair of passages adapted for connection with opposite chambers of a fluid actuated motor of the double acting or reversible oscillating or reciprocating or cylinder type, check valves in said passages in said valve body normally preventing the flow of fluid from said chambers inwardly through said passages whereby said motor is normally retained in a predetermined position, a valve member rotatable relative to said valve body and having a passage therein adapted for connection with a source of fluid and with exhaust and selectively with one of said passages in said valve body, means for restricting said passage in said valve member whereby the flow of fluid through said passage in said valve member, may be decreased to cause pressure to be built up in a part of said passage in said valve member including the part adapted to be selectively connected with said passages in said valve body, means for connecting with exhaust the check valve in the passage of said pair of passages in said valve body other than the passage with which said valve member is connected, and means for opening the check valve in the passage of said pair of passages in said valve body other than the passage with which said passage in said valve member is connected.

11. In a valve mechanism, the combination of a valve body having a pair of passages each pair adapted for connection with opposite chambers of a fluid actuated motor of the double acting or reversible oscillating or reciprocating or cylinder type, check valves in said passages in said valve body normally preventing the flow of fluid inwardly through said passages whereby said motor is normally retained in a predetermined position, a valve member rotatable relative to said valve body and having a passage therein adapted for connection with a source of fluid and with exhaust and selectively with one of said passages in said valve body, means for connecting to exhaust the passage in said valve body of said pair of passages other than the passage connected with said passage in said valve member when one of said passages in said valve body is connected with said passage in said valve member, means for restricting the flow of fluid through said passage in said valve member to cause pressure to be built up in a part of said passage in said valve member including the part adapted to be selectively connected with said passages in said valve body, and means including a movable member responsive to pressure in said passage in said valve member for opening the check valve in the passage of said pair of passages in said valve body other than the passage with which said passage in said valve member is connected.

12. In a valve mechanism, the combination of a valve body having a pair of passages each pair adapted for connection with opposite chambers of a fluid actuated motor of the double acting or reversible oscillating or reciprocating or cylinder type, check valves in said passages in said valve body normally preventing the flow of fluid inwardly through said passages whereby said motor is normally retained in a predetermined position, a valve member rotatable relative to said valve body and having a passage therein adapted for connection with a source of fluid and with exhaust and selectively with one of said passages in said valve body, means for connecting to exhaust the passage of said pair of passages in said valve body other than the passage connected with said passage in said valve member when one of said passages in said valve body is connected with said passage in said valve member, means for restricting the flow of fluid through said passage in said valve member to cause pressure to be built up in a part of said passage in said valve member including the part adapted to be selectively connected with said passages in said valve body, means including a movable member responsive to pressure in said passage in said valve member for opening the check valve in the passage of said pair of passages in said valve body other than the passage with which said passage in said valve member is connected, and dash-pot means associated with said movable member.

13. In a valve mechanism, the combination of a valve body having a pair of passages adapted for connection with opposite chambers of a fluid actuated motor of the double acting or reversible oscillating or reciprocating or cylinder type, check valves in said passages in said valve body normally preventing the flow of fluid inwardly through said passages whereby said motor is normally retained in a predetermined position, a valve member rotatable relative to said valve body and having a passage therein adapted for connection with a source of fluid and with exhaust and selectively with one of said passages in said valve body, means for connecting to exhaust the passage of said pair of passages in said valve body other than the passage connected with said passage in said valve member when one of said passages in said valve body is connected with said passage in said valve member, means for restricting the flow of fluid through said passage in said valve member to cause pressure to be built up in a part of said passage in said valve member including the part adapted to be selectively connected with said passages in said valve body, means for opening the check valve in the passage of said pair of passages in said valve body other than the passage with which said passage in said valve member is connected, and relief valve means for preventing the building up of excessive pressure in said passage in said valve member.

14. In a valve mechanism, the combination of a valve body having a pair of passages adapted for connection with opposite chambers of a fluid actuated motor of the double acting or reversible oscillating or reciprocating or cylinder type, check valves in said passages in said valve body normally preventing the flow of fluid inwardly through said passages whereby said motor is normally retained in a predetermined position, a valve member rotatable relative to said valve body and having a passage therein adapted for connection with a source of fluid and with exhaust and selectively with one of said passages in said valve body, means for connecting to exhaust the passage of said pair of passages in said valve body other than the passage connected with said passage in said valve member when one of said passages is connected with said passage in said valve member, means for restricting the flow of fluid through said passage in said valve member to cause pressure to be built up in a part of said passage in said valve member including the part adapted to be selectively connected with said passages in said valve body, and a slidable piston responsive to pressure in said passage in said valve member for opening the relief valve in the passage of said pair of passages in said valve body other than the passage with which said passage in said valve member is connected.

15. In a valve mechanism, the combination of a valve body having a pair of passages adapted for connection with opposite chambers of a fluid actuated motor of the double acting or reversible oscillating or reciprocating or cylinder type, check valves in said passages in said valve body normally preventing the flow of fluid inwardly through said passages whereby said motor is normally retained in a predetermined position, a valve member rotatable relative to said valve body and having a passage therein adapted for connection with a source of fluid, and with exhaust and selectively with one of said passages in said valve body, means for connecting to exhaust the passage of said pair of passages in said valve body other than the passage connected with said passage in said valve member when one of said passages in said valve body is connected with said passage in said valve member, means for restricting the flow of fluid through said passage in said valve member to cause pressure to be built up in a part of said passage in said valve member including the part adapted to be selectively connected with said passages in said valve body, means including a movable member responsive to pressure in said passage in said valve member for opening the check valve in the passage of said pair of passages in said valve body other than the passage with which said passage in said valve member is connected, and means for retaining said movable member in position to maintain said check valve open independently of the pressure in said passage in said valve member.

16. In a valve mechanism, the combination of a valve body having a plurality of pairs of passages each pair adapted for connection with opposite chambers of a different fluid actuated motor, means in said passages in said valve body normally preventing the flow of fluid from said chambers inwardly through said passages in said valve body whereby said motors are normally retained in predetermined positions, a valve member movable relative to said valve body and having a passage therein adapted for connection with a source of fluid and selectively with any one of said passages in said valve body, and means for connecting to exhaust the passage of a pair of said passages in said valve body other than the passage of said pair of passages connected with said passage in said valve member when a passage of one of said pairs of passages in said valve body is connected with said passage in said valve member and means for opening the first-named means in the passage of said pair of passages in said valve body other than the passage of said pair with which said passage in said valve member is connected.

17. In a valve mechanism, the combination of a valve body having a plurality of pairs of passages each pair adapted for connection with opposite chambers of a different fluid actuated motor of the double acting or reversible oscillating or reciprocating or cylinder type, means in said passages in said valve body normally preventing the flow of fluid from said chambers inwardly through said passages whereby said motors are normally retained in predetermined positions, a valve member rotatable relative to said valve body and having a passage therein adapted for connection with a source of fluid and with exhaust and selectively with one of said passages in said valve body, means for connecting to exhaust the passage of said pair of passages in said valve body other than the passage of said pair connected with said passage in said valve member when a passage of one of said pairs of passages is connected with said passage in said valve member, means for restricting the flow of fluid through said passage in said valve member to cause pressure to be built up in a part of said passage in said valve member including the part adapted to be selectively connected with said passages in said valve body, and means for opening the first-named means in the passage of said pair of passages other than the passage of said pair with which said passage in said valve member is connected.

18. In a valve mechanism, the combination of a valve body having a plurality of pairs of passages each pair adapted for connection with opposite chambers of a different fluid actuated motor of the double acting or reversible oscillating or reciprocating or cylinder type, means in said passages in said valve body normally preventing the flow of fluid from said chambers inwardly through said passages whereby said motors are normally retained in predetermined positions, a valve member rotatable relative to said valve body and having a passage therein adapted for connection with a source of fluid and with exhaust and selectively with one of said passages in said valve body, means for connecting to exhaust the passage of a pair of said passages in said valve body other than the passage of said pair connected with said passage in said valve member when a passage of one of said pairs of passages in said valve body is connected with said passage in said valve member, means for restricting the flow of fluid through said passage in said valve member to cause pressure to be built up in a part of said passage in said valve member including the part adapted to be selectively connected with said passages in said valve body, a single manually operable lever for producing relative rotation between said valve body and said valve member to selectively connect said passage in said valve member with one of said passages in said valve body and for controlling the movement of said means for restricting the flow of fluid through said passage in said valve member, and means for opening the first-named means in the passage of said pair of passages other than the passage of said pair with which said passage in said valve member is connected.

19. In a valve mechanism, the combination of a valve body having a plurality of pairs of passages each pair adapted for connection with opposite chambers of a different fluid actuated motor of the double acting or reversible oscillating or reciprocating or cylinder type, check valves in said passages normally preventing the flow of fluid inwardly through said passages in said valve body whereby said motors are normally retained in predetermined positions, a valve member rotatable relative to said valve body and having a passage therein adapted for connection with a source of fluid and with exhaust and selectively with one of said passages in said valve body, means for connecting to exhaust the passage of a pair of said passages in said valve body other than the passage connected with said passage in said valve member when a passage of one of said pairs of passages in said valve body is connected with said passage in said valve member, means for restricting the flow of fluid through said passage in said valve member to cause pressure to be built up in a part of said passage in said valve member including the part adapted to be selectively connected with said passages in said valve body, and means responsive to pressure in said passage in said valve member for opening the check valve in the passage of a pair of passages in said valve body other than the passage of said pair with which said passage in said valve member is connected.

20. In a valve mechanism, the combination of a valve body having a plurality of pairs of passages adapted for connection with opposite chambers of a different fluid actuated motor of the double acting or reversible oscillating or reciprocating or cylinder type, check valves in said passages in said valve body normally preventing the flow of fluid inwardly through said passages whereby said motors are normally retained in predetermined positions, a valve member rotatable relative to said valve body and having a passage therein adapted for connection with a source of fluid and with exhaust and selectively with one of said passages in said valve body, means comprising a conduit in said valve member for connecting to exhaust the passage of a pair of said passages in said valve member other than the passage connected with said passage in said valve member when a passage of one of said pairs of passages is connected with said passage in said valve member, means for restricting the flow of fluid through said passage in said valve member to cause pressure to be built up in a part of said passage including the part adapted to be selectively connected with said passages in said valve body, and means for opening the check valve means in the passage of said pair of passages in said valve body other than the passage of said pair with which said passage in said valve member is connected.

ELMER VAN SICKLE.

REFERENCES CITED

The following references are of record in the file of this patent:

UNITED STATES PATENTS

| Number | Name | Date |
|---|---|---|
| 2,308,727 | Temple | Jan. 19, 1943 |
| 2,342,770 | Temple | Feb. 29, 1944 |
| 2,360,987 | Temple | Oct. 24, 1944 |
| 2,397,299 | Strid | Mar. 26, 1946 |
| 2,401,258 | Livers | May 28, 1946 |